Nov. 22, 1955 P. W. HEMMINGER ET AL 2,724,323
AUTOMATIC BASTING DEVICE
Filed May 19, 1950 2 Sheets-Sheet 2
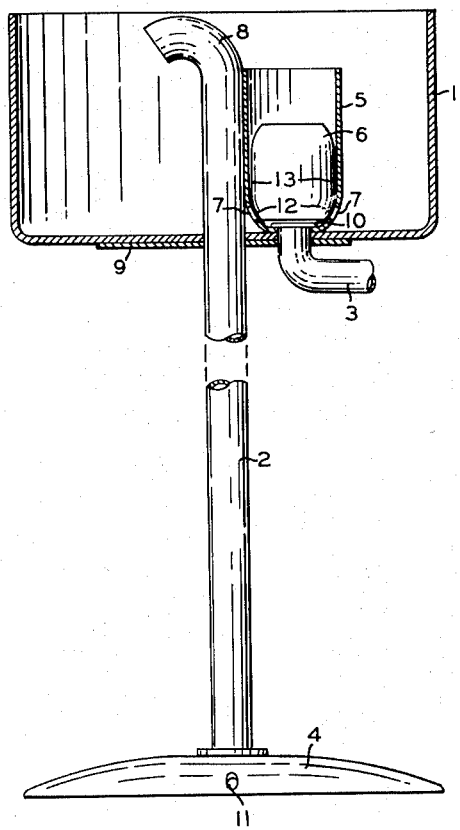
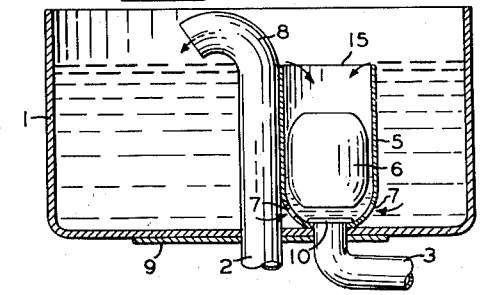
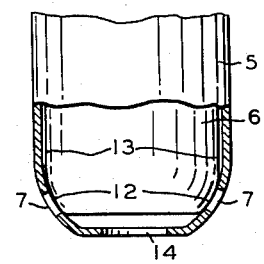
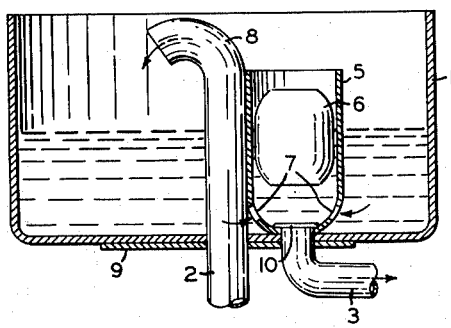
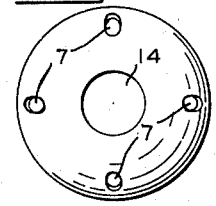
INVENTORS:
Paul W. Hemminger
Grace P. Freeman United States Patent Office 2,724,323
Patented Nov. 22, 1955

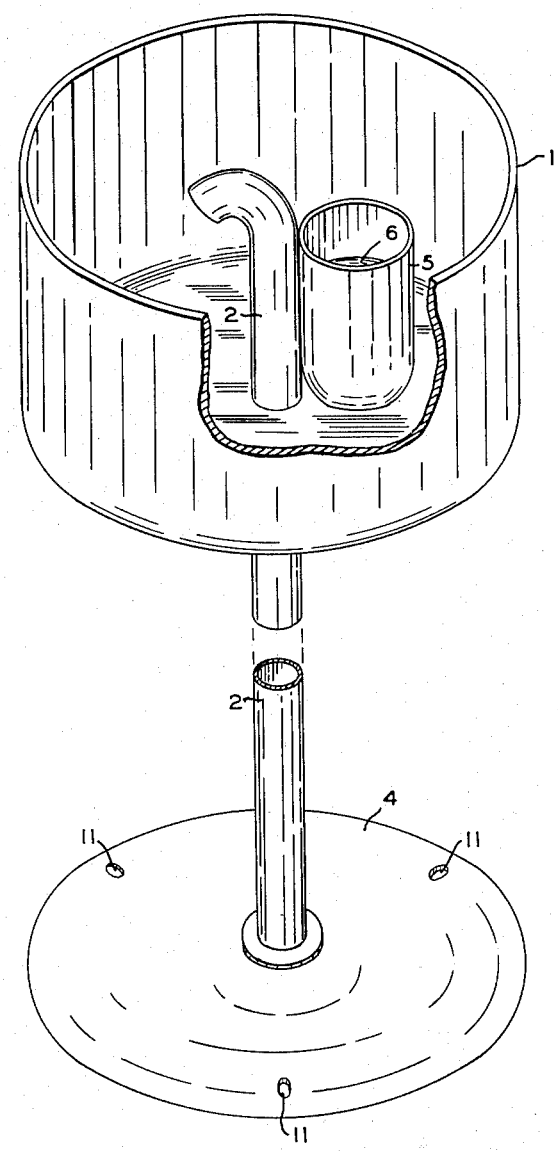

2,724,323
AUTOMATIC BASTING DEVICE

Paul W. Hemminger, Franklin Park, and Grace P. Freeman, Park Ridge, Ill.

Application May 19, 1950, Serial No. 162,994

2 Claims. (Cl. 99—346)

This invention relates in general to basting devices used in the preparation of roasted foods and in particular to an automatic basting device.

In present-day basting, the basting liquid is manually spilled over the roasting food at regular intervals or the basting is accomplished by a semi-automatic baster which continuously bastes by use of a device called a "drip pan." In a semi-automatic baster of this type, the time required for the "browning" of the roasting food is not controlled at all or is controlled by manual means.

Accordingly, the principal object of this invention is to provide a basting device which is fully automatic and which will baste at regular intervals.

Another object of the invention is to provide an automatic basting device in which the period of the basting cycle will vary according to the temperature of the basting liquid.

Still another object of the invention is to provide a basting device that is inexpensive to manufacture, yet efficient and reliable.

Other objects and features of the invention will become apparent as the description progresses.

The accompanying drawings, comprising Figs. 1 to 5A, disclose a preferred embodiment of the invention as follows:

Fig. 1 is a perspective view of a desired embodiment of the present invention;

Fig. 2 is a sectional view of the invention taken along lines 2—2 of Fig. 1;

Figs. 3 and 4 are sectional views of the reservoir illustrating the operation of the valve;

Fig. 5 is an enlarged view, partly in section, of the valve; and

Fig. 5A is a bottom view of the float guide.

*General description*

Referring now in particular to Figs. 1 and 2, it will be observed that the basting device is comprised of a reservoir 1, an inlet 2, an outlet 3, and a base 4. The outlet 3 is normally closed by float 6 being at rest at the bottom of well or float guide 5.

The basting device is placed in a roasting utensil with the base 4 being completely submerged in the basting liquid and with the outlet 3 disposed over the food being basted. The base is so constructed that the basting liquid, when heated, will rise through inlet 2 and fill reservoir 1. The time required for reservoir 1 to become filled is predetermined by the size of the base 4, the size of inlet 2, the height of float guide 5 and the temperature of the basting liquid. When the basting liquid in reservoir 1 has reached the level equal to the height of float guide 5, it will overflow into the float guide causing float 6 to rise. The rising of float 6 will open the valve to outlet 3, permitting the basting liquid to be spilled over the roasting food. When the reservoir has emptied, float 6 will settle at the bottom of float guide 5, again closing the valve to outlet 3. The reservoir will then refill and the basting cycle will repeat until the basting is completed.

*Detailed description*

The invention having been described generally, a detailed description will now be given.

Referring now to Figs. 2, 3, and 4, it will be observed that base 4 contains apertures 11 which permit the basting liquid to enter the cup-like base. Upon being heated, a pressure will be established which is great enough to cause the basting liquid to travel upwardly through inlet 2 and overflow into reservoir 1.

Portion 8 of inlet 2 is curved outwardly and downwardly to prevent any basting liquid from splashing over the sides of reservoir 1 and to prevent any basting liquid from entering float guide 5 until the basting liquid in reservoir 1 reaches a level equal with the uppermost portion 15 of float guide 5.

The basting liquid in reservoir 1 is prevented from entering the float guide 5 or outlet 3 through apertures 7 as these apertures are closed by portion 12 of float 6. The pressure of the basting liquid against the portion of float 6 defined by apertures 7 is not great enough to cause the float to become buoyant.

The operation of the valve may be more clearly seen by referring to Fig. 5 which shows an enlarged view of the float guide and float. When the level of the basting liquid in reservoir 1 reaches the top of float guide 5, the liquid then overflows into the guide 5. The sides 13 of float 6 are somewhat smaller than the inside diameter of float guide 5 and permits the basting liquid to flow between the sides of float 6 and float-guide 5. When enough liquid flows into the float guide, float 6 becomes buoyant and rises. This causes apertures 7 of float-guide 5 to open and permit the basting liquid to flow into the float guide and to be released through outlet 3. As seen in Fig. 5, the size of apertures 7 are such that the amount of liquid flowing into float-guide 5 will be somewhat greater than the liquid flowing out through outlet 3, hence the liquid in float-guide 5 will assume a level equal to the liquid level in the reservoir, causing apertures to remain open. As the liquid flows out over the roasting food the liquid level in the reservoir becomes lower, causing the liquid level in the float guide to lower also. When the reservoir empties, float 6 assumes a position at the bottom of float guide 5 and closes apertures 7. The reservoir will then refill and the basting cycle will be repeated.

Figs. 3 and 4 pictorially illustrate the operation of the basting device. Fig. 3 shows the liquid level just above the uppermost portion 15 of float guide 5 and the liquid flow is illustrated by the arrows. The arrows in inlet 2 show the liquid flowing into the reservoir 1, while the remaining arrows indicate the basting liquid flowing into float guide 5. Fig. 4 illustrates the position of float 6 when the level of the liquid in the reservoir equals the level of the liquid in float guide 5.

A feature of the invention is that as the temperature increases about the food being basted, the period between basting cycles is correspondingly decreased because the liquid is supplied to the reservoir more quickly, thereby effecting proper basting at varying temperatures.

While we have shown a particular embodiment of the invention, it will, of course, be understood that we do not wish to be limited thereto, since many modifications may be used, and we, therefore, contemplate by the appended claims to cover all such modifications as fall within the true spirit and scope of the invention.

We claim:

1. In a basting device, a first container, a second container located within the first container, the second container having an outlet through the first container, inlets to the second container being the outlets of the first container, said inlets comprising at least one top inlet and at least one bottom inlet, the second container including a float comprising valve means for opening and closing said bottom inlet and said outlet of the second container, said float being adapted to open said bottom inlet and said outlet of the second container responsive to the level of liquid therein established by the liquid flow through said top inlet whereby the liquid level in both said containers becomes equal by liquid flow through said bottom inlet and substantially all the liquid in both the containers is released through the outlet of the second container to close the said bottom inlet and the said outlet of the second container.

2. In a basting device, a base comprising liquid-lifting means, a first container, an upstanding tubular section interconnecting said base and said first container and arranged to permit liquid flow from said base into said first container, a second container located within the first container, the second container having an outlet through the first container, inlets to the second container being the outlets of the first container, said inlets comprising at least one top inlet and at least one bottom inlet, the second container including a float comprising valve means for opening and closing said bottom inlet and said outlet of the second container, said float being adapted to open said bottom inlet and said outlet of the second container responsive to the level of liquid therein established by the liquid flow through said top inlet whereby the liquid level in both said containers becomes equal by liquid flow through said bottom inlet and substantially all the liquid in both the containers is released through the outlet of the second container to close the said bottom inlet and the said outlet of the second container.

References Cited in the file of this patent

UNITED STATES PATENTS

| Number | Name | Date |
|---|---|---|
| 590,626 | Pardo | Sept. 28, 1897 |
| 774,972 | Staples | Nov. 15, 1904 |
| 814,752 | Walker | Mar. 13, 1906 |
| 833,566 | Walker | Oct. 16, 1906 |
| 1,093,601 | Blichmann | Apr. 21, 1914 |
| 1,339,625 | Holloway | May 11, 1920 |
| 1,460,486 | Harvey | July 3, 1923 |
| 1,466,273 | Crouse | Aug. 28, 1923 |
| 1,973,561 | Essex | Sept. 11, 1934 |
| 1,977,486 | Louis | Oct. 16, 1934 |
| 2,101,819 | Roehrich | Dec. 7, 1937 |
| 2,329,608 | Graham et al. | Sept. 14, 1943 |

FOREIGN PATENTS

| Number | Country | Date |
|---|---|---|
| 7,305 | Great Britain | 1891 |
| 173,052 | Germany | July 5, 1906 |
| 801,659 | France | Aug. 12, 1936 |